No. 745,637. PATENTED DEC. 1, 1903.
F. J. MACHALSKE.
PROCESS OF PRODUCING CARBON CHLORIDS AND SILICON.
APPLICATION FILED SEPT. 16, 1903.
NO MODEL.
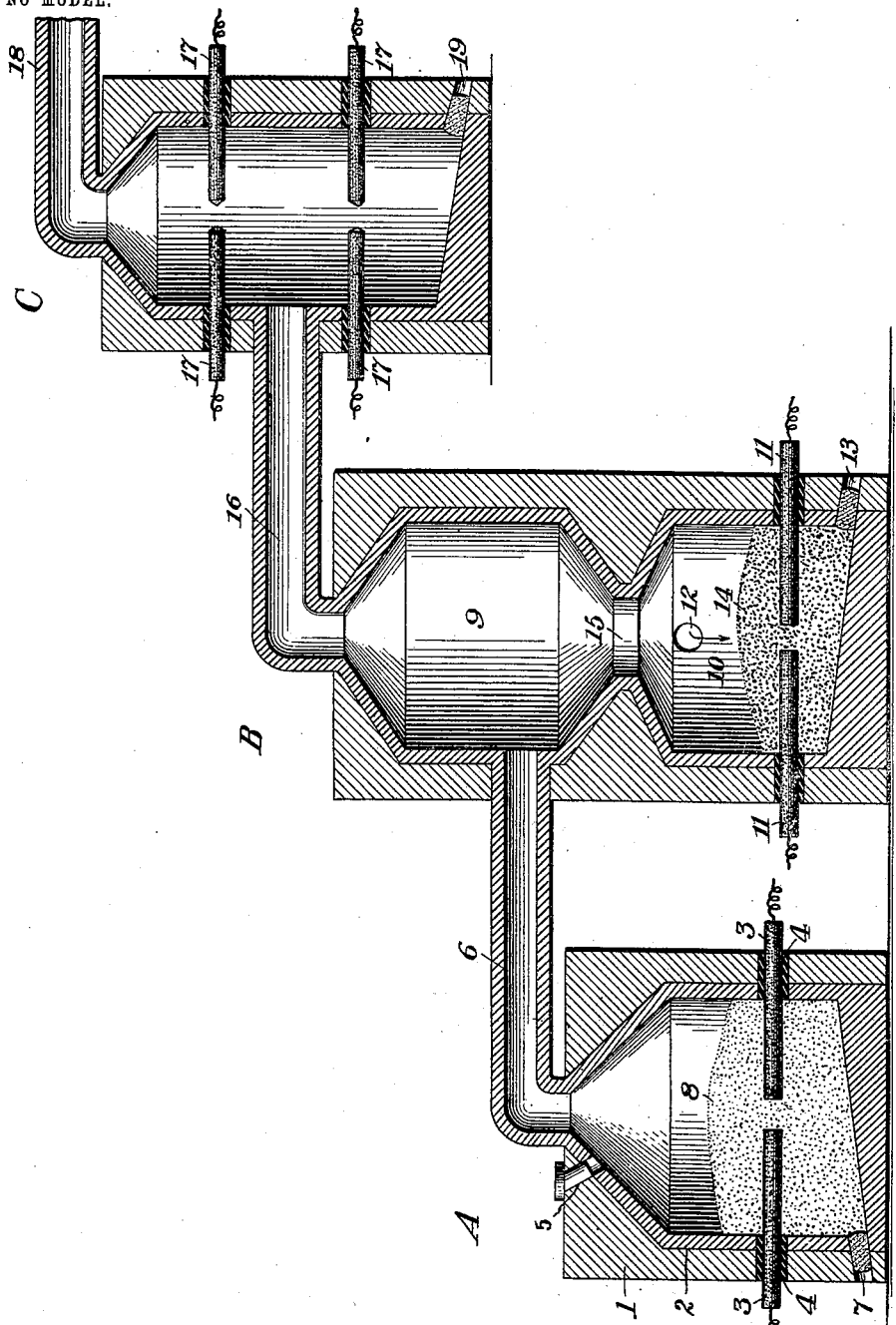
Witnesses:
R. A. Balderson.
J. B. Hill.
Inventor:
Florentine Joseph Machalske,
by Byrnes & Townsend,
Att'ys.

UNITED STATES PATENT OFFICE.

FLORENTINE JOSEPH MACHALSKE, OF BROOKLYN, NEW YORK.

PROCESS OF PRODUCING CARBON CHLORIDS AND SILICON.

SPECIFICATION forming part of Letters Patent No. 745,637, dated December 1, 1903.

Application filed September 16, 1903. Serial No. 173,456. (No specimens.)

*To all whom it may concern:*

Be it known that I, FLORENTINE JOSEPH MACHALSKE, a citizen of the United States, residing at Brooklyn, in the county of Kings and State of New York, have invented certain new and useful Improvements in Processes of Producing Carbon Chlorids and Silicon, of which the following is a specification.

According to this process a chlorid of silicon, usually the tetrachlorid, is caused to react on a carbon compound, such as carbon disulfid or methane, under such conditions that the silicon and carbon interchange and the resulting carbon chlorid is driven off, enabling it to be condensed or utilized. The reaction is usually effected in an electric furnace and in an atmosphere which is non-oxidizing and free from water. When carbon disulfid is employed, the reaction between it and the silicon chlorid produces silicon sulfid, ($SiS_2$,) which may be readily reduced to metallic silicon by heating it with carbon, the resulting carbon disulfid being again utilized in the first stage of the process. The silicon chlorid is preferably produced according to the process of my application, Serial No. 126,427, filed October 9, 1902, by heating a mixture of silica and sodium chlorid in an electric furnace, from which the silicon chlorid is delivered as a gas.

A suitable apparatus for carrying out the process is shown in the accompanying drawing, in which the figure is a vertical longitudinal section. It is to be understood that this apparatus is merely illustrative and that the process is in no way limited to its use.

The apparatus shown comprises an electric furnace A for the production of the silicon chlorid, a structure B, having a mixing-chamber which receives the silicon chlorid and carbon disulfid, with an electric furnace for producing the disulfid, and an electric furnace C, which receives the mixed gases and supplies the heat requisite to effect the reaction.

The furnace A comprises a stack 1, of refractory non-conducting material, such as fire-brick, with a lining 2 of magnesia brick. Electrodes 3 3 pass adjustably through refractory non-conducting sleeves 4 in the sides of the furnace. A charge-opening 5, with suitable closure, extends through the top wall. An outlet-flue 6 for the carbon chlorids rises from the upper end of the furnace and leads to the mixing-chamber. A tap-hole 7 leads from the lower part of the furnace-chamber.

For the production of silicon tetrachlorid the furnace A is charged with a water-free mixture 8 of silica, preferably in the form of sand, and four parts of an alkali chlorid, preferably sodium chlorid. An electric current is then passed between the electrodes and through the charge, heating the mixture to a temperature sufficient to effect the reaction. The gaseous silicon tetrachlorid escapes from the furnace through the flue 6, and the residue (molten sodium oxid) may be withdrawn through the tap-hole 7. Aqueous vapor and air or other oxidizing atmosphere should be excluded from the furnace during the operation. As it is undesirable that carbon should be present in the furnace in any form, the electrodes 3 are preferably of metallic silicon. Silicon dichlorid may be produced instead of the tetrachlorid by employing a charge containing one part of silica and two parts of sodium chlorid.

The structure B contains the mixing-chamber 9, which receives the silicon chlorid from furnace A through the flue 6. Beneath the mixing-chamber and opening into its lower end is an electric furnace 10, having electrodes 11, a charging-opening 12, and a tap-hole 13. This furnace is used to produce carbon disulfid, a charge 14, which may consist of a mixture of carbon and sulfur, being placed around the ends of the electrodes and heated to the necessary temperature by an electric current passed between them. The resulting vapors of carbon disulfid rise and escape through the passage 15 into the chamber 9, where they mix with the vapors of silicon chlorid from the furnace A. The gaseous mixture escapes from the chamber 9 through a flue 16 and is delivered to the electric furnace C.

The furnace C serves to heat the mixed gases to the temperature necessary to effect the reaction between them. This furnace is in general similar to the furnace A, one or more pairs 17 of electrodes, which may here be of carbon, platinum, &c., being arranged to heat the mixture of silicon chlorid and carbon disulfid by means of arcs sprung between the ends of the adjacent electrodes. The carbon chlorid finally escapes through the outlet-flue 18, and the silicon sulfid also produced by the reaction may be withdrawn through the tap-hole 19. The silicon sulfid from furnace C may be conveniently employed for the production of carbon disulfid by charging it, admixed with an equivalent amount of carbon, into the electric furnace 10 in lieu of or as an addition to the charge of carbon and sulfur. The metallic silicon produced by the reduction of the silicon sulfid may be withdrawn through the tap-hole 13. It is also obvious that carbon disulfid may be supplied from some outside source and that the vaporized disulfid and the silicon chlorid from the furnace A may then be delivered directly into the reaction-furnace C.

Methane or other carbon compounds may be substituted for carbon disulfid as a source of carbon. When a mixture of one combining weight of silicon tetrachlorid and of methane is heated to the proper temperature in the reaction-furnace C, the silicon and carbon interchange with the production of carbon tetrachlorid and silicon hydrid, according to the equation $SiCl_4 + CH_4 = CCl_4 + SiH_4$. This silicon hydrid may be advantageously used for the production of finely 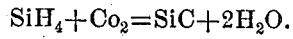 silicon carbid or carborundum by burning the hydrid in an atmosphere of carbon dioxid. This reaction may be expressed by the following equation:

$$SiH_4 + Co_2 = SiC + 2H_2O.$$

I claim—

1. The process of producing carbon chlorids, which consists in causing a substance containing carbon and a silicon chlorid to react under such conditions that the carbon is combined with the chlorin of the silicon chlorid, as set forth.

2. The process of producing carbon chlorids, which consists in causing a carbon compound and a silicon chlorid to react under such conditions that the carbon compound is decomposed and the carbon combined with the chlorin of the silicon chlorid, as set forth.

3. The process of producing carbon tetrachlorid, which consists in causing a carbon compound and silicon tetrachlorid to react under such conditions that the carbon compound is decomposed and the carbon combined with the chlorin of the silicon chlorid, as set forth.

4. The process of producing carbon chlorids, which consists in heating a substance containing carbon and a silicon chlorid, in an atmosphere which is substantially non-oxidizing and free from water, to a temperature sufficient to cause the carbon to combine with the chlorin of the silicon chlorid, as set forth.

5. The process of producing carbon chlorids, which consists in electrically heating a substance containing carbon and a silicon chlorid, in an atmosphere which is substantially non-oxidizing and free from water, to a temperature sufficient to cause the carbon to combine with the chlorin of the silicon chlorid, as set forth.

6. The process of producing carbon chlorids, which consists in causing carbon disulfid and a silicon chlorid to react with the production of a carbon chlorid and silicon sulfid, as set forth.

7. The process of producing carbon chlorids and silicon, which consists in causing carbon disulfid and a silicon chlorid to react with the production of a carbon chlorid and silicon sulfid, and reducing said silicon sulfid to silicon by heating it in the presence of carbon, as set forth.

8. The process of producing silicon, which consists in heating silicon sulfid in the presence of a reducing agent, as set forth.

9. The process of producing carbon chlorids, which consists in heating a mixture of silica and an alkali chlorid to a temperature sufficient to effect the production of a silicon chlorid and an alkali oxid, mixing said silicon chlorid with a carbon compound, and supplying sufficient heat to cause the carbon compound to be decomposed and the carbon to combine with the chlorin of the silicon chlorid, as set forth.

10. The process of producing carbon chlorids, which consists in electrically heating a mixture of substances containing carbon and sulfur, thereby producing gaseous carbon disulfid, mixing the carbon-disulfid vapor with a silicon chlorid, and heating the mixture to a temperature sufficient to effect the production of the carbon chlorid and silicon sulfid, as set forth.

In testimony whereof I have affixed my signature in presence of two witnesses.

FLORENTINE JOSEPH MACHALSKE.

Witnesses:
A. B. MARTIN,
JAS. CANARY.